Dec. 17, 1946.    R. HASKINS, JR., ET AL    2,412,614
GYROSCOPIC INSTRUMENT
Filed Feb. 26, 1943    2 Sheets-Sheet 1
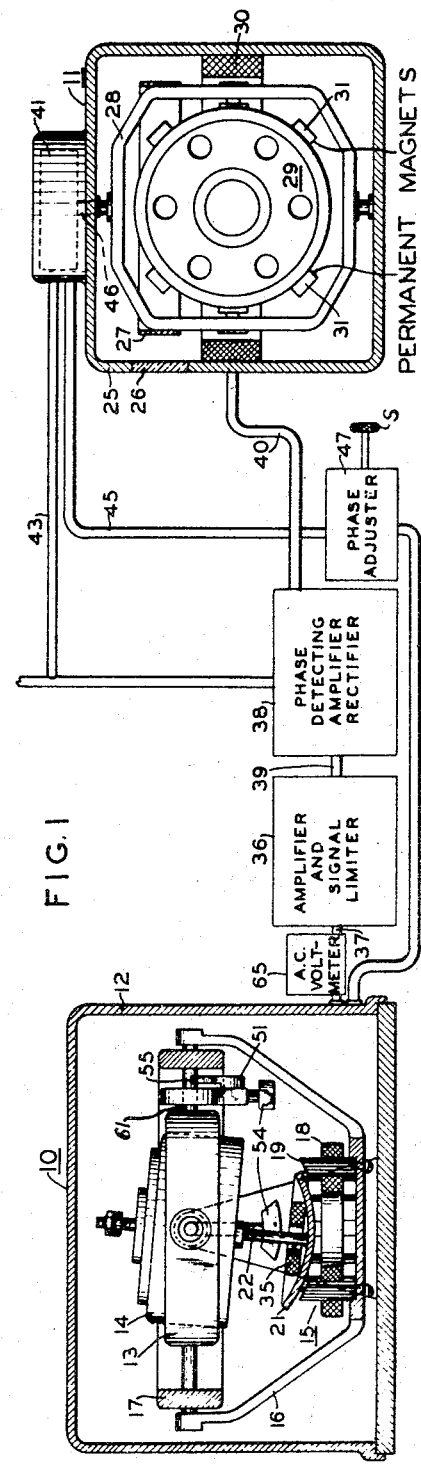
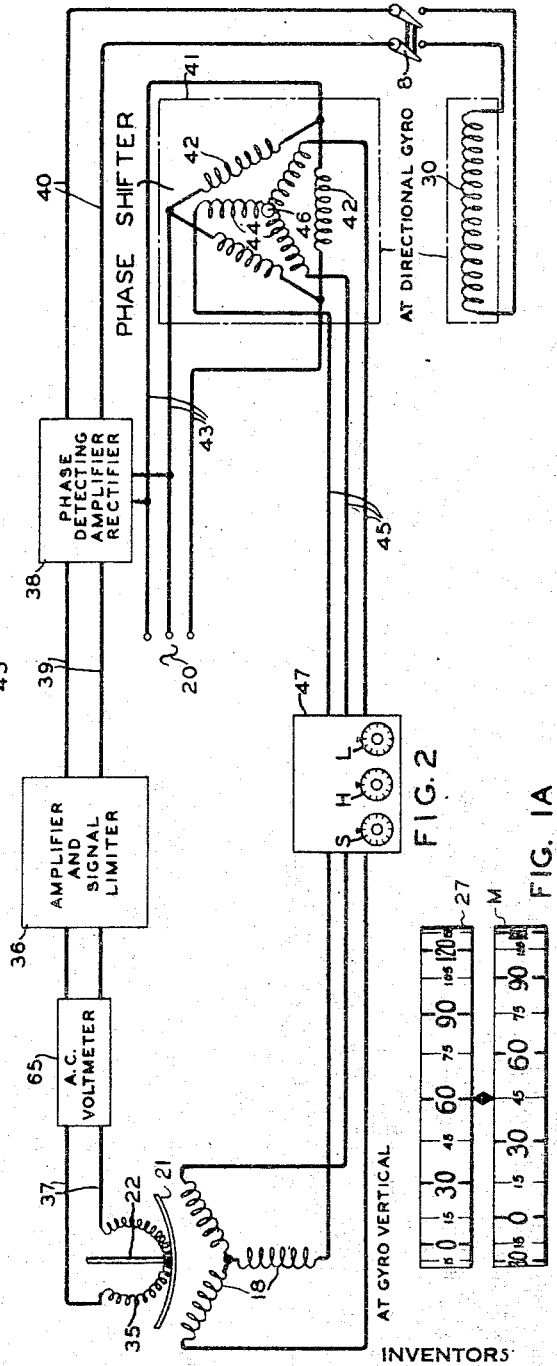
INVENTORS
R. HASKINS, JR.
O. E. ESVAL
BY Herbert H. Thompson
THEIR ATTORNEY Dec. 17, 1946.   R. HASKINS, JR., ET AL   2,412,614
GYROSCOPIC INSTRUMENT
Filed Feb. 26, 1943   2 Sheets-Sheet 2

INVENTORS:
R. HASKINS, JR.
O. E. ESVAL
BY Herbert H. Thompson
THEIR ATTORNEY

Patented Dec. 17, 1946

2,412,614

UNITED STATES PATENT OFFICE 2,412,614

GYROSCOPIC INSTRUMENT

Robert Haskins, Jr., Garden City, and Orland E. Esval, Huntington, N. Y., assignors to Sperry Gyroscope Company, Inc., Brooklyn, N. Y., a corporation of New York Application February 26, 1943, Serial No. 477,296

12 Claims. (Cl. 33—226)

This invention relates to gyroscopic instruments of the character primarily adapted to function as a gyro compass.

One of the objects of the invention resides in the combination of a gyro vertical and a directional gyro in a novel manner to provide an instrument of this character, which is less subject to error than the standard gyro compass.

A further object of the invention consists in the provision of an instrument which also may be utilized in indicating the direction of the resultant of the angular velocity effects on a gyroscopic device due to the horizontal component of spin of the earth and the movement of the craft itself with relation to the earth. By performing this function, we are enabled to determine the true ground track and ground speed of an aircraft without observation of the ground or wind.

The invention further discloses a novel method of deriving the magnitude and direction of the angular velocity of a craft about the center of the earth due to its own movement. This vector may be utilized in obtaining the true ground speed and ground track of the craft and once obtained may be inserted as corrections in the instrument to give true heading.

Other objects, as well as features and structural details of the invention, will be apparent from the following description when read in relation to the accompanying drawings, wherein Fig. 1 is a schematic view showing a preferred form of the improved gyro compass.

Fig. 1A is a diagram showing how the magnetic compass heading and gyro heading may be compared.

Fig. 2 is a circuit diagram of the arrangement and relation of the electrical parts of the instrument illustrated in Fig. 1.

Figure 5:
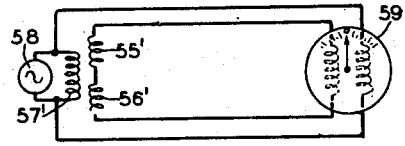
Figure 6:
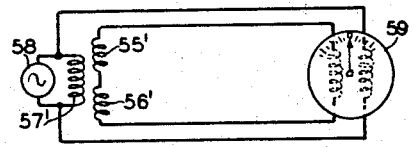
Figure 7:
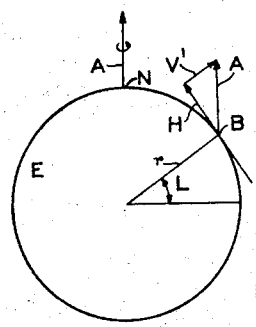
Figure 8:
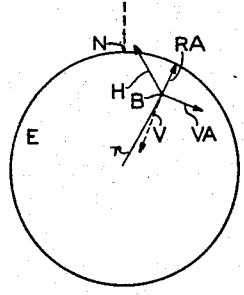
Figure 11:
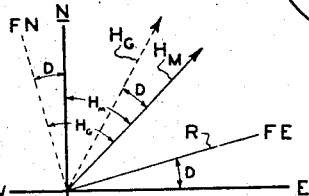
Figure 9:
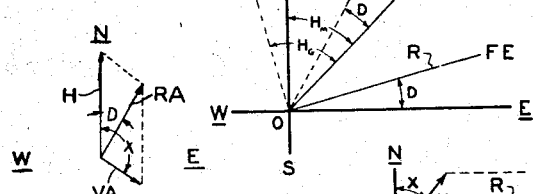
Figure 10:
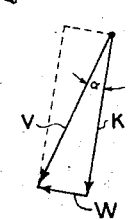
Figure 12:
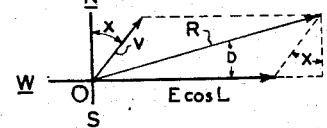

Figs. 5 and 6 are similar wiring diagrams as respectively employed in connection with each of the pick-offs shown in Figs. 3 and 4, Figs. 7, 8, 9, 11 and 12 are vector diagrams illustrating the method employed in deriving both the angular velocity and the true ground track and speed of the craft on which the instrument is utilized, Figs. 7 to 9 being angular velocity vectors and Figs. 11 and 12 linear velocity vectors, and Fig. 10 is a vector diagram showing how the wind speed and direction may be obtained from the ground speed and course and the air speed and heading.

The improved gyro compass as shown in Figs. 1 and 2 is formed by a directional gyro 11 that is slaved to a gyro vertical 10 whose spin axis tilts in an east-west plane as the earth rotates until a condition of equilibrium is reached between the effect of the movement of the earth and the erecting means provided in the gyro vertical tending to restore the spin axis to a substantially vertical condition. The azimuth direction of the plane in which this small angle of tilt is located provides the reference by which the gyro vertical controls the directional gyro to form the improved gyro compass instrument. As shown in Fig. 1, the gyro vertical instrument 10 includes a casing 12, a gimbal ring 13 and rotor bearing case 14 which are arranged in a conventional manner. The gyro rotor (not shown) is contained within the case 14 and is suitably spun about a substantially vertical axis. The rotor case 14 is universally mounted with reference to the casing 12 by means of the gimbal ring 13. Further, the rotor case 14 is preferably mounted in the casing 12 in neutral equilibrium.

The rotor bearing case 14 of the described gyro vertical instrument is restrained from tilting more than a predetermined amount by electromagnetic means of the character shown and described in detail in U. S. Letters Patent No. 2,229,645, issued to Esval and Frische on January 28, 1941. Such means as herein shown includes a rotating field producing stator 15 which is universally mounted on a pendulous bail 16 and gimbal ring 17. The windings and poles of this stator are respectively indicated at 18 and 19. Stator 15 maintains a vertical reference for the rotor bearing case 14, the same being supplied with energy from a suitable source 20. The energy supplied to the stator is preferably three-phase alternating current. An inductor member 21, which may be constructed in the form of a segment of a spherical cup, is fixedly mounted on the case 14 by means of rod 22. Upon relative tilt of the case and the reference maintaining stator 15, the inductor or cup 21 links with the moving flux field of the stator and a torque is exerted by the cup on the case substantially at right angles to the tilt that tends to erect the gyroscope. When the condition of equilibrium heretofore described between the erecting force on the gyro and the effect of the earth's rotation on the gyro occurs, it will be understood that the spin axis of the gyro vertical is tilted from the vertical in an east-west plane.

The conventional type of directional gyro instrument indicated at 11 in the drawings includes a casing 25 having a window 26 therein through which the observer views the compass card 27. As shown in the present instance, card 27 is fixedly mounted on a vertical ring 28 mounted for pivotal movement on a vertical axis within the casing 25. The gyro rotor bearing case 29 for the directional gyro is pivotally mounted on the ring 28 in a conventional manner. The gyro rotor (not shown) is rotatably mounted within the case 29 and is spun by suitable means (not shown). The spin axis of the gyro rotor and the tilt axis of the case 29 are mutually perpendicular and normally lie in a horizontal plane. For controlling the directional gyroscope, we show a conventional type of torque exerting means such as coil 30 fixed to the casing 25 and permanent magnets 31 which are mounted on the rotor bearing case 29. Coil 30 is differentially energized to produce a reversible flux field that cooperates with the steady field of the magnets 31 to exert a torque about the tilt axis of the case 29 and consequently effect procession of the ring 28 in a desired manner. If desired, a make-and-break switch 8 may be interposed ahead of the coil 30 to render it temporarily ineffective under certain conditions.

The excitation of coil 30 is controlled from a pick-up coil 35 which is situated within the inductor member 21 of the erecting means for the gyro vertical instrument. As stated above, the spin axis of the erected gyro vertical tilts in the east-west plane of the earth due to the movement of the earth about its axis. The rotor case 14 of the gyro vertical consequently assumes a tilted position such as shown in Fig. 1. It will be understood that any change in phase of the voltage signal at stator 18 changes the direction of the tilt reducing torque on the rotor case of the gyro vertical and is normally effective to restore the tilt of the rotor case of the gyro vertical to an east-west plane. The effect of the angular velocity of the craft relative to the earth in shifting the tilt of the rotor case of the gyro vertical from an east-west plane is corrected by adjustment of settable knob S on a phase adjusting device indicated at 47.

A coil 35 fixed to rod 22 is employed to detect azimuthal movement of the tilt plane of the rotor case 14 away from an east-west plane. As shown diagrammatically in the drawings, the signal induced in the coil 35 is fed to a suitable audio frequency amplifier of conventional construction where the signal is amplified linearly. Reference is made to page 170, Figure (a) of the book entitled "Fundamentals of Radio," published 1942 by Prentice Hall Inc. for a showing of a conventional amplifier circuit. The signal limiter not specifically shown may be a pair of selenium cells arranged to by-pass to ground any voltage signal above a desired maximum. Inasmuch as the present invention does not pertain to either linear amplifiers or limiting circuits the same have not been illustrated in detail.

The amplified signal from amplifier 36 is fed by way of leads 39 to a phase detecting amplifier and rectifier 38 that may be of the type specifically shown in Figs. 11 and 13 of the drawings and described in detail in U. S. Patent No. 2,383,461, issued August 28, 1945, for Flux valve compass systems in the names of O. E. Esval, R. S. Curry, C. F. Fragola and L. F. Beach. To obtain an output that is effective to control the directional gyro, a receiver in the form of the phase detecting amplifier rectifier 38 compares the amplified signal from the coil 35 with the signal of one of the phases of the three phase supply 20 which provides a reference signal. As shown in Fig. 2, the reference signal is fed directly from the source 20 to the rectifier 38. With the system properly oriented and the tilt reducing means of the gyro vertical effective, the signal induced in the coil 35 is 180° out of phase with the signal of the reference so that the rectifier 38 produces a null output. When the signal of the coil 35 leads or lags the reference signal by other than 180°, a direct current signal of positive or negative polarity is fed to coil 30 of the directional gyro to precess the same about its vertical axis until a condition of equilibrium is again reached in the system.

The instrument includes a phase shift device indicated generally at 41, the same being mounted on the casing 25 with its rotor fixed to the vertical shaft 46 of the directional gyro. As shown in Fig. 2, the star or delta-connected stator windings 42 of the device 41 are connected to the energy source 20 by way of leads 43. The rotor windings 44 of the device are connected through leads 45 to the windings 18 of the stator 15 of the tilt reducing means for the gyro vertical. This arrangement functions as a repeat back control for the gyro vertical which allows the signal of the coil 35 and the reference signal to be properly compared regardless of the heading of the craft. Electrically the phase shift device 41 may be considered a three-phase transformer having relative movable windings one of which is positioned by the vertical ring of the directional gyro. When coil 30 of the instrument is energized, the ring 28 precesses and rotor 44 is moved in a direction that controls the field of the stator 18 so that the signal in the coil 35 is restored to a 180° out of phase condition relative to the reference voltage signal. From the foregoing, it is clear that the reference signal is fixed and the phase of signal of the coil 35 changes relative thereto when the ring of the directional gyro wanders from its correct orientation relative to the earth. Also, when the craft changes heading, the phase of the energizing signal supplied to the stator 18 is changed by the phase shift device so that normally the signal of the pick-off 35 remains 180° out of phase with the reference signal at such time.

The instrument so far described would give an approximate compass heading at the compass card 27, but an additional correction due to the north-south component velocity of the craft, well known in the art of gyro-compasses as the north steaming error, may be utilized if the true meridian is to be indicated under all conditions of speed, course and latitude. While such a correction may be interposed elsewhere, we prefer to put the correction in between the two gyroscopes 10 and 11 as by means of a phase-shifting correction device indicated generally at 47, which is placed in the connections between the winding 46 of differential transformer 41 and the stator 18 of the tilt-reducing means 15.

The mechanics of such a correction device is well known in the art, one example of which is shown in the patent to Sperry, Serial No. 1,403,062, dated January 10, 1922. As explained in this patent, the correction to be introduced is obtained by mechanical solution of the following equation:

$$\tan D = \frac{S \cos H}{E \cos L}$$

where D is the small correction in the course angle of the ship, S the speed of the ship, H the heading, L the latitude, and E the linear speed of the earth at the equator, the equation showing that the correction is zero when the ship is standing still or headed 90°, that is, east or west. It is in any event quite small for all ordinary ship speeds.

The device 47 is therefore shown with three setting knobs, "S" for ship's speed, "H" for heading and "L" for latitude, the device therefore resembling the dummy compass correction device shown in Fig. 9 of the above patent, in which speed, latitude and heading are set in by hand. The final correction appears as a small shift in the lubber line 151 of Fig. 9 (or lubber ring 52 of Figs. 2 and 3), and it is this slight motion which may be utilized to shift the movable plates of three variable condensers (not shown), one in each of the leads 45. The adjustment of such condensers results in a variable slight shift of the phase of the voltage signal reaching the stator 18 so that the relation between the two gyroscopes is altered by the amount of the correction. The instrument therefore will give true gyroscopic compass heading at card 27.

As the device is actually used, the knobs S, H and L need be readjusted only in case of a material change of the factors concerned, and even then, since the correction is small, the change need not be made simultaneously with the change in the factors. As an example, upon the craft changing heading, the compass card on the gyro remains fixed in azimuth by the action of the directional gyro and therefore the craft, in rotating around it, will show the approximate new heading. After the new heading is obtained, the dial H is adjusted by hand to indicate the new heading, and the appropriate correction will thereby be introduced by the correction mechanism.

Figure 3:
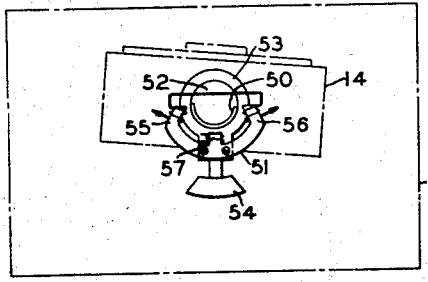
Fig. 3 is a detail side elevation of the pick-off unit employed in ascertaining the extent and direction of the tilt of the rotor bearing case of the gyro vertical member of the instrument.
Figure 4:
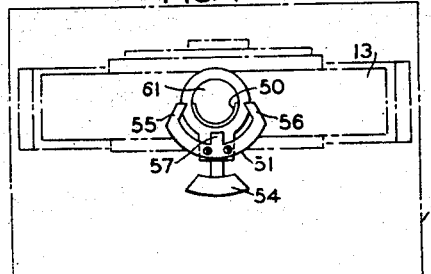
Fig. 4 is a view similar to Fig. 1 showing the pick-off at the axis of the gimbal ring of the gyro vertical.

In order to extend the usefulness of the improved instrument, a tilt measuring pick-off may be employed at each of the axes of universal mounting of the gyro vertical. As shown in Figs. 3 and 5, the pick-offs employed are of the transformer or induction type having an armature 50 and a three-legged wound magnetic core member 51. This type of pick-off is particularly shown and described in the copending application of Wilson and Esval, Serial No. 463,286, filed October 24, 1942. Curved armatures 50 are preferably of the type which produce an output signal which is proportional in magnitude and variable in phase with the amount and direction of angular displacement of the parts. The pick-off detecting tilt about the axis of the rotor bearing case 14 is shown in Fig. 3. Armature 50 is fixedly mounted in this instance on an extending portion of the trunnion 52 of the case. The reference maintaining core member 51 is fixed to a plate 53 that is pivoted coaxially with said trunnion, the same being made pendulous by means such as weight 54. The central leg or pole of the core 51 of the magnetic pick-off is indicated at 57. The windings for the respective poles are indicated in Fig. 5 by the reference numbers 57, 55' and 56', coils 55' and 56' being connected in opposition and coil 57' energized from a suitable single phase source 58. A heavily damped alternating current meter of the conventional D'Arsonval type of current measuring meter, generally indicated at 59, may be employed to measure the output of the magnetic pick-off. The pick-off and circuit noted in Figs. 4 and 6 are similar to that described in connection with Figs. 3 and 5, in the present instance, however, the armature 50' being situated on the trunnion 61 of the gimbal ring 13 and the pick-off consequently being effective to measure the tilt of the gyro vertical about this axis of universal mounting of the instrument. The D'Arsonval meters 59 are both read to obtain a measure of the angular tilt of the spin axis of the gyro rotor relative to the pendulums.

Our improved instrument may also be employed to determine the true ground speed and ground track or course of the craft. With such use of the instrument, the dials S, H and L of the phase adjusting device 47 are set at zero. This information may be obtained by the proper trigonometric solution, using the difference in the reading of the compass card 27 and the magnetic compass card M (Fig. 1A), and from some means for measuring the amount of the tilt of the gyro vertical in its position of rest or equilibrium from which the angular (and hence the linear) speed of the craft about the center of the earth may be estimated. When these factors are properly combined with the known horizontal component of the speed of the earth in the approximate latitude, the true course and ground speed of the aircraft may be obtained, as will be evident from the following analysis.

Referring to Fig. 11, line OH$_M$ represents the heading of the craft as read on a magnetic compass (to which proper corrections for magnetic variations, etc., have been applied so that the reading represents displacement from true north), and dotted line OH$^G$ represents the heading of the craft as read on the uncorrected gyro compass card 27. The angle D therebetween will then represent the error in the instrument reading due to the velocity of the same over the earth's surface. A line OFN may also be drawn at the angle D to north, representing the false north indicated by the uncorrected gyro compass, and similarly, a line OFE may be drawn at the angle D to east, representing the false east indicated by the uncorrected gyro compass.

Referring now to Fig. 12, a line may be drawn parallel to OE and of a length proportional to the horizontal component of the earth's speed in that latitude, namely, E cos L, where E is the linear speed of the earth at the equator. Line R is then drawn at an angle D to OE and of a length that is proportional to the amount of tilt of the gyro vertical which has been calibrated, which in turn is a measure of the angular speed of the craft's curvilinear speed due both to the earth's rotation and to its own speed. Since R is formed of a combination of these two quantities, the craft's speed and direction may be obtained readily by vector analysis. Thus, by completing the rectangle by joining the end of E cos L and the end of R as shown, a line V will be obtained which will represent in length the actual velocity of the craft over the earth's surface and the angle that it makes with north will represent the actual course of the craft.

Examination of the diagram will show that these quantities may be obtained by calculation as well as graphically, as follows:

$$V^2 = (E \cos L)^2 + R^2 - 2(E \cos L) R \cos D$$

of which $E \cos L$, $R$ and $D$ are known. Also, from Fig. 12, $$\sin x = \frac{R \cos D - E \cos L}{V}$$

of which $R$, $\cos D$ and $E \cos L$ are known, and $V$ is determinable from the first equation.

The explanation may be clearer by using angular velocity vectors instead of linear velocity vectors. This method employed in obtaining the craft's true ground speed track is shown diagrammatically in Figs. 7 to 10, inclusive. As depicted in Fig. 7, the earth is represented by the circle E, with the north pole at N. The angular velocity of the earth at point B is indicated by the vector A, the horizontal and vertical components of the velocity vector A being shown at H and V', respectively. The rotational vector component H is situated in a horizontal plane with reference to the surface of the earth. The magnitude of this vector is proportional to the cosine of the latitude angle L. The magnitude of this vector is known for any latitude. The vector is also always directed to the geographic north.

If the craft is moving over the earth's surface as shown at V in Fig. 8, the angular velocity of the same with reference to the earth may be represented by a vector VA which is perpendicular to the ground track of the craft. The direction and magnitude of the vector VA is the unknown to be determined by the present system. It is assumed to be horizontal, as the craft must maintain steady, level flight during the period of observation. Vector RA shown in Fig. 8 is the resultant of vectors H and VA. When the resultant vector RA has a component in a north-south direction, a couple is exerted on the gyro vertical so that the tilt plane of the rotor case 14 lies outside of the defined east-west plane. The extent of the tilt of the rotor bearing case of the gyro vertical is measured by the meters 59 that receive the respective outputs of the pick-off devices, or by meter 65. The magnitude of vector RA is ascertained by reference to a table containing calibrated values corresponding to the relative scale readings of the galvanometers. The direction of the vector from geographic north (D) is ascertained by reference to the magnetic compass of the craft and the gyroscopic compass reading, as explained in connection with the linear velocity vector diagrams. Vector RA is consequently plotted on a chart as shown in Fig. 9 at the angle D with the known vector component H. These quantities form two sides of a triangle. The third side is determined from the triangle, the same being vector VA which is the true angular velocity of the craft over the surface of the earth in direction and magnitude. The linear velocity vector V which is perpendicular to the vector VA is obtained by multiplying the magnitude of the angular vector by the constant "r" which is the radius of the curvilinear path of the craft about the earth. The linear velocity vector V determines the ground speed and true course of the airplane.

With reference to Fig. 10, the drift angle of the craft may be obtained by a vector triangle whose component known sides are made up of a ground velocity vector corresponding to V and an air velocity vector K drawn in the direction of the heading of the craft as read on the magnetic compass and of a length proportional to airspeed of the airplane. The vector W in this figure is indicative of the direction and velocity of the wind and the angle "α" is the drift angle.

In use as a ground speed track computing instrument, the directional gyro 11 may be dispensed with leaving only the gyro vertical 10 and the magnitude and direction of the resultant vector V determined by the reading of the respective meters 59 with reference to a predetermined heading, as described above, but an instrument such as a magnetic compass would have to be utilized in any event. After the determination is completed, the knobs S, H and L are adjusted for the indicated ground speed, course and latitude, and the instrument is restored to operate in a normal manner. It will then continue to give accurate readings if the knob adjustments are changed whenever the speed, course, and latitude changes materially.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro compass instrument comprising, a gyro vertical, tilt reducing means for the gyro vertical including means for producing a magnetic flux field, a directional gyro, electrical means for exerting an azimuth precessing torque on the directional gyro, a pick-off at the gyro vertical in the field of said producing means, means for comparing the phase of the output of said pick-off with a fiixed phase to produce a signal output controlling the torque exerting electrical means of the directional gyro, and means for controlling the flux field producing means of the tilt reducing means of the gyro vertical from the directional gyro so that no torque is exerted on the directional gyro when the plane of tilt of the gyro vertical due to rotation of the earth lies in an east-west plane of the earth.

2. A gyro compass instrument comprising, a gyro vertical, electromagnetic tilt reducing means for said gyro vertical including means for producing a magnetic flux field, a pick-off in the flux field of said tilt reducing means and responsive to tilt of the gyro vertical to produce a signal output, a receiver for the output of said pick-off that compares the same with a reference signal and normally produces a null output with the reference signal and pick-off output 180° out of phase, a directional gyro, and electrical means controlled by the output of said receiver for exerting an azimuth precessing torque on the directional gyro.

3. In a gyroscopic instrument for dirigible craft, the combination of a gyro vertical having an A. C. tilt reducing means including a magnetic flux field producing member, an electrical pick off on said gyro vertical linking the flux field of said tilt reducing means due to the effect of the rotation of the earth thereon to produce an A. C. signal, an A. C. source providing a reference signal, means for comparing the signals of the source and pick off producing an output when the signals are other than 180° out of phase, a directional gyro controlled in azimuth by the output of said comparing means, and means for energizing said tilt reducing means including a phase shifting device operatively connected to said directional gyro to change the phase of the energizing signal with change in heading of the craft.

4. An instrument as claimed in claim 3, in which said phase shifting device is a transformer having relatively movable windings, one of which is positioned by the directional gyro and the other of which is fixed relative thereto.

5. A gyro compass comprising a gyro vertical, means for reducing tilt of the gyro vertical including a member producing a magnetic flux field, an electrical pick off linking the flux field of said member due to the effect of the rotation of the earth thereon to produce an A. C. signal, an A. C. source providing a reference signal, means for comparing the signals of the source and pick off producing an output when the signals are other than 180° out of phase, a directional gyro controlled in azimuth by the output of said comparing means, and means for energizing said tilt reducing means including a first phase shifting device operatively connected to said directional gyro to change the phase of the energizing signal with change in heading and a second phase shifting device operable to change the phase of the energizing signal to correct the instrument for errors therein due to course, speed and latitude.

6. In a gyro compass, a gyro vertical having an A. C. tilt reducing means including a magnetic flux field producing member, a directional gyro, and means for energizing said tilt reducing means including a first phase shifting device operatively connected to said directional gyro to change the phase of the energizing signal with change in heading and a second phase shifting device operable to change the phase of the energizing signal to correct the instrument for errors therein due to course, speed and latitude.

7. In a gyroscopic instrument for dirigible craft, a gyro vertical having an A. C. tilt reducing means including a magnetic flux field producing member, a directional gyro, and means for energizing said tilt reducing means including a phase shifting device operatively connected to said directional gyro to change the phase of the energizing signal with change in heading of the craft.

8. In a gyro compass, a gyro vertical having tilt reducing means including a magnetic flux field producing member, an electrical pick off on said gyro vertical situated in the flux field of said member, and a directional gyro controlled in azimuth by the output of said electrical pick off.

9. An instrument for indicating the direction of the resultant of the angular velocity effect on a gyroscopic device due to the combined horizontal component of the spin of the earth and the movement of the craft on which the instrument is employed comprising a gyro vertical having tilt reducing means including a magnetic flux field, an electrical pick off on said gyro vertical linking the flux field of said tilt reducing means due to the combined effect thereon of the horizontal component of the spin of the earth and the movement of the craft to produce an A. C. signal, an A. C. source providing a reference signal, means for comparing the signals of the source and pick off producing an output when the signals are other than 180° out of phase, a directional gyro controlled in azimuth by the output of said comparing means, and means for energizing said tilt reducing means including a phase shifting device operatively connected to said directional gyro to change the phase of the energizing signal with change in heading of the craft.

10. An instrument as claimed in claim 9, which includes means for measuring the amplitude of the output signal of the pick off.

11. An instrument for indicating the direction of the resultant of the angular velocity effect on a gyroscopic device due to the combined horizontal component of the spin of the earth and the movement of the craft on which the instrument is employed comprising a gyro vertical having tilt reducing means, a pick off providing an output responsive to tilt of the gyro vertical, a directional gyro, and means for orienting said directional gyro by the output of said pick off to obtain a directional indication therefrom in accordance with the tilt plane of the gyro vertical.

12. A gyro compass instrument comprising a gyro vertical and a directional gyro, A. C. tilt reducing means for said gyro vertical including means for producing a magnetic flux field, means for precessing said directional gyro in azimuth, a repeat-back device operated by said directional gyro to change the phase of the signal supplied the field flux producing means as the craft on which the directional gyro is mounted changes heading, power means for producing a reference signal of fixed phase, a pick-off at the gyro vertical in the field of said producing means, and means for operating said precessing means including means for comparing the phase of the reference and pick-off signals to produce a null output with the tilt plane of the gyro vertical in the east-west plane of the earth, said comparing means producing an output when the signal of the pick-off either leads or lags the signal of the reference by other than 180° to cause said directional gyro to precess in a direction that restores the output to a null condition.

ROBERT HASKINS, Jr.
ORLAND E. ESVAL.